Aug. 22, 1967   TATSUO KONDO   3,337,165
VIBRATION DAMPING DEVICE
Filed March 21, 1966

INVENTOR
Tatsuo Kondo
By Stevens, Davis, Miller & Mosher
ATTORNEYS

United States Patent Office 3,337,165
Patented Aug. 22, 1967

3,337,165
VIBRATION DAMPING DEVICE
Tatsuo Kondo, Tokyo, Japan, assignor to Victor Company of Japan, Limited, Yokohama, Japan, a corporation of Japan
Filed Mar. 21, 1966, Ser. No. 535,780
Claims priority, application Japan, Mar. 26, 1965, 40/17,489
4 Claims. (Cl. 248—15)

ABSTRACT OF THE DISCLOSURE

A vibration damping device having a supporting plate for mounting a vibrating body, a weight supporting plate with a weight mounted thereon, and a base plate clamped together by clamping means in such a manner that the first two mentioned plates are spaced apart and the base plate is interposed between them at a node of the vibration of said clamping means.

This invention relates to a device for attenuating the vibration of a vibrator such as a motor, and more particularly to a vibration damping device whereby an undesirable vibration produced when a motor is operated can be prevented from being transmitted to essential parts.

An undesirable minute vibration is usually produced when an electric motor is operated. It is essential to check this vibration especially in a phonograph record player. Present practice requires the use of a motor board or a turntable which is thick and of a great mass so that it may not be in resonance with the vibration of a motor. The disadvantage of this method of checking vibration is that it causes an increase in the weight of the assembly and consequently an increase in manufacturing cost.

The present invention contemplates the provision of a weight of a relatively small mass at a proper position to attenuate the vibration produced by a rotating motor, thereby obviating the disadvantage of prior art.

A principal object of this invention is to provide a vibration damping device which is adapted to prevent the transmission of an undesirable vibration, produced when a motor is in operation, to essential parts.

Another object of this invention is to provide a vibration damping device whereby a vibration of a motor mounting board caused by a rotating motor can be checked by means of a weight mounted at a proper position.

Still another object of this invention is to provide a vibration damping device whereby a vibration produced by a rotating phonomotor in a phonograph record player etc. can be attenuated by means of a weight mounted at a proper position, so that the assembly incorporating this invention is light in weight and can be produced at reduced cost.

Further objects and advantages of the invention will become apparent when the detailed description hereafter set forth is read in conjunction with the appended drawings, in which FIG. 1 is a perspective view of one embodiment of this invention;

When a vibrating motion is imparted to one of the two open ends of a U-shaped fork such as tuning fork, a vibration reversed in phase to said vibration is generally caused to occur in the other open end, and a node of the vibration is positioned on the bottom of the fork, that is, there occurs no vibration in the bottom.

According to the present invention, two supporting plates and clamping means are arranged in a U-shape, and a motor and a weight are carried by the two supporting plates respectively in such a way that said weight is caused to be in resonance with the vibration of said motor, while a base plate is conveniently mounted at a position corresponding to a node of the vibration where there is no vibration.

In general, when the weight of a mass $m$ rests on one end of a plate of a spring constant $k_s$ which is fixed at the other end, the natural frequency $f_0$ of said weight can be obtained from the following formula:

$$f_0 = \frac{1}{2\pi}\sqrt{\frac{k_s}{m}}$$

Precise spring constants $k_s$ depend on the material, length, construction, etc. of the plate, and may include those of secondary vibrations $K_2$, $K_3$, $K_4$ . . . in addition to the basic vibration $K_1$. It is essential here that the weight should be in resonance with the natural frequency $f$ of the motor in operation. The mass $m$ of the weight and the spring constant $k_s$ are selected in such a way that the resonance takes place in the manner described hereinabove.

The invention will now be explained in detail with reference to the drawings.

Figure 1:
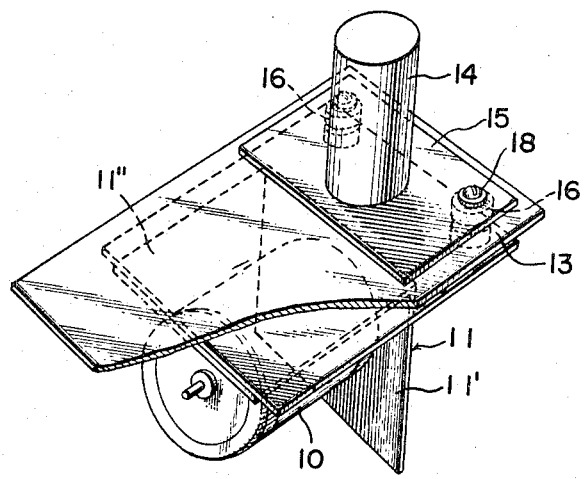
Figure 3:
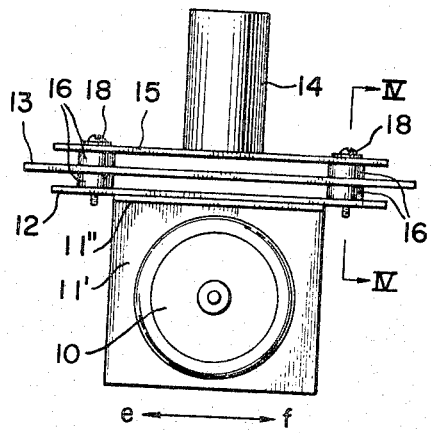
FIG. 3 is a front view of the embodiment shown in FIG. 1.
Figure 4:
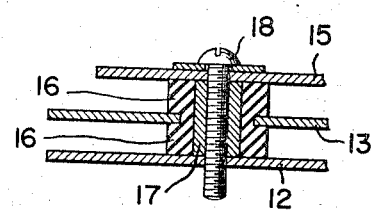
FIG. 4 is a longitudinal sectional side view on the line IV—IV of FIG. 3.

FIGS. 1 to 4 show an embodiment of the invention as applied to a phonograph record player, such as a juke box. In the drawings, 10 is a phonomotor for turning a record (not shown), which is mounted on one plate 11' of a motor mounting member 11 in the shape of an inverted letter L as seen from the side, the other plate 11" of said mounting member 11 which is positioned at right angles to said plate 11' being affixed to a motor supporting plate 12. 13 is a base plate by which the assembly of this invention is supported. 14 is a weight which is mounted on a weight supporting plate 15 and arranged in such a way that the center of gravity of said weight is in a vertical plane of said supporting plate including the axial line of said motor. 16 is a resilient member such as a rubber bush, and 17 is a metal pipe inserted into said rubber bush and extending through said base plate 13 to be positioned between said motor supporting plate 12 and said weight supporting plate 15. 18 is a clamping screw which, as shown in a longitudinal sectional side view in FIG. 4, is inserted into said metal pipe to hold said motor supporting plate 12 and said weight supporting plate 15 together at one end thereof, so that aforementioned U-shaped fork is formed by said motor supporting plate 12, said weight supporting plate 15 and said clamping screw 18.

In a typical application, the illustrative embodiment of the invention is composed in such a way that it includes the motor weighing 500 gm., supporting plates and the base plate formed of iron and 1.6 mm. in thickness, and the weight weighing 220 gm., said motor and said weight being mounted in such a way that the distance between the motor supporting plate 12 and the axis of the motor is 68 mm., the distance between the clamping screw and the end of mounting member 11 is 61.5 mm., and the distance between the clamping screw and the center of gravity of the weight is 42 mm.

Figure 2:
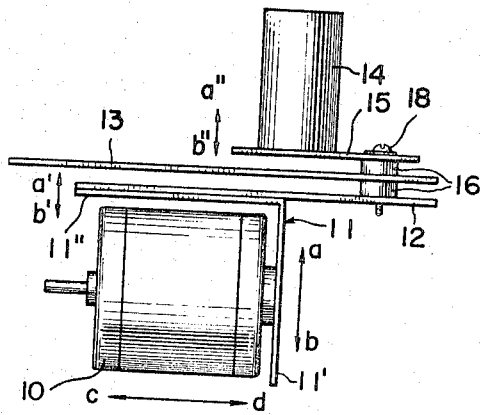
FIG. 2 is a side view of the embodiment shown in FIG. 1.

The vibration of the motor 10 produced as it rotates will be broken down to its components for various directions. It will be noted that the vibration of the motor consists of vibration components occurring in the direction of arrows *a–b*, *c–d* and *e–f* as shown in FIGS. 2 and 3. The vibration component occurring in the direction of arrow *a–b* is converted into a vibration occurring at an open end of the motor supporting plate 12 in the direction of arrow *a'–b'*, which causes the weight supporting plate 15 to vibrate in the direction of arrow *a"–b"* in resonance. A node of the vibration, which is free from vibration, occurs at an intermediate point on the clamping screw 18, so that the vibration component *a–b* of the motor is scarcely transmitted to the base plate 13 which is positioned at said node. The vibration component of the motor occurring in the direction of arrow *c–d* causes the motor supporting plate 12 to sag and vibrate in the direction of arrow *a'–b'*, so that the vibration component *c–d* is scarcely transmitted to the base plate 13 positioned at the node. The vibration component occurring in the direction of arrow *e–f* is checked by the mass of the weight 14.

Figure 5:
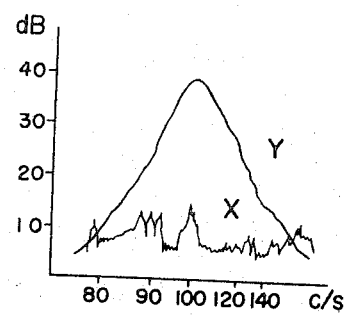
FIGS. 5 to 7 are diagrams showing vibration levels in explanation of the advantage of this invention.
Figure 6:
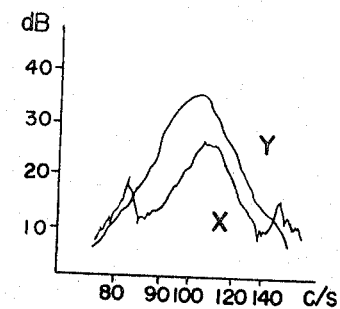
Figure 7:
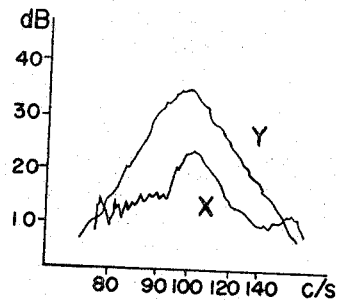

FIGS. 5 to 7 show curves representing vibration levels of the typical application of this invention composed as described hereinabove, comparing vibration of the assembly having the weight mounted thereon with vibration of the assembly having no weight mounted thereon. In all the figures, the ordinates represent vibration levels shown in db, while the abscissae represent vibration frequencies shown in c./s. FIG. 5 shows vibration levels of the vibration component *a–b*, a curve X representing a vibration level of the assembly having the weight mounted thereon and a curve Y representing a vibration level of the assembly having no weight mounted thereon. It will be seen from the figure that the use of the weight, which is particularly effective in attenuating vibration in the neighborhood of 100 c./s., causes a fall of the vibration level by about 30 db. In like manner, it will be understood from FIGS. 6 and 7 showing vibration levels of the vibration components *c–d* and *e–f*, respectively, that the use of the weight is particularly effective in attenuating the vibration in the neighborhood of 100 c./s.

Figure 8:
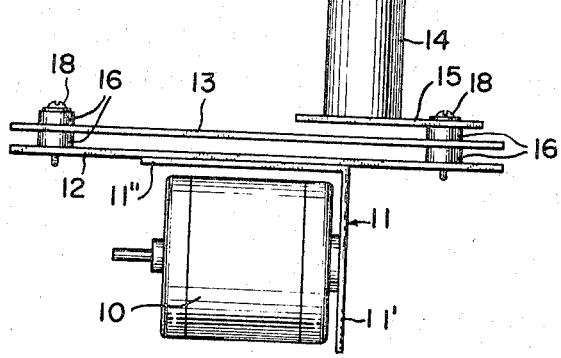
FIG. 8 is a side view of another embodiment of this invention.

In order to increase the mechanical strength of the base plate 13, the motor supporting plate 12 and the base plate 13 may, as shown in FIG. 8 be held together at the other ends thereof by means of the clamping screw 18 through the rubber bush 16 so as to prevent the transmission of the vibration.

It is to be understood that the invention is not limited to the embodiments shown and described, and that changes may be made therein without departing from the scope and spirit of the invention which is defined in the appended claims.

What is I claim is:
1. A vibration damping device comprising a supporting plate for mounting a vibrating body, a weight, a weight supporting plate mounting said weight thereon, a clamping means for holding said plates at one of their ends in such a way that said two plates are spaced apart a certain distance from each other, and a base plate mounted at a node of the vibration of said clamping means interposed between said first-mentioned plates.

2. A vibration damping device comprising a vibrating body, a supporting plate mounting said body, a weight, a weight supporting plate mounting said weight, clamping means for holding said body supporting plate and said weight supporting plate at one of their ends in such a way that said two plates are spaced apart a certain distance from and in parallel relationship with each other, and a base plate having one end positioned at a node of vibration of said clamping means interposed between said body supporting plate and said weight supporting plate and disposed in parallel relationship with said two supporting plates, said body and said weight being arranged in such a way that they are disposed on the same side of said clamping means.

3. The vibration damping device as defined in claim 2 wherein said vibrating body is a motor.

4. A vibration damping device comprising a motor, a motor supporting plate mounting said motor adjacent one end thereof, a weight having a mass which is relatively smaller than the mass of said motor, a weight supporting plate mounting said weight adjacent one end thereof, clamping means for holding said motor supporting plate and said weight supporting plate at the other ends thereof in such a way that said two plates are spaced apart a certain distance from and in parallel relationship with each other, and a base plate disposed in a plane including a node of vibration of said clamping means interposed between said motor supporting plate and said weight supporting plate and in parallel relationship with said two supporting plates, said motor and said weight being arranged in such a way that they are disposed on the same side of said clamping means.

References Cited

UNITED STATES PATENTS

| 1,973,510 | 9/1934 | Schieferstein | 248—364 X |
| 2,881,995 | 4/1959 | Neher | 248—15 |
| 3,198,528 | 8/1965 | Van Antwerp | 248—15 XR |
| 3,223,374 | 12/1965 | Butler et al. | 248—358 |

JOHN PETO, *Primary Examiner.*